Figure 1:
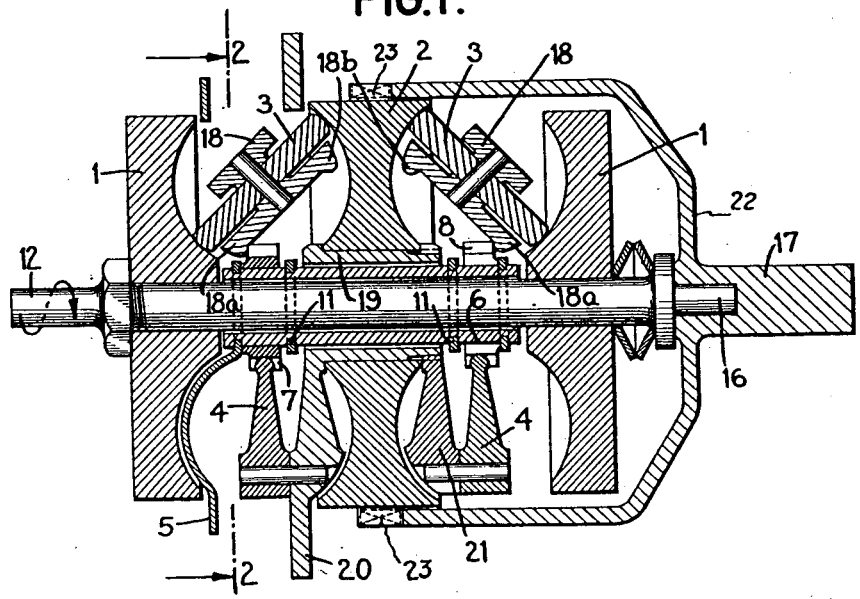

Dec. 18, 1934.   F. A. HAYES   1,984,797
VARIABLE SPEED POWER TRANSMISSION MECHANISM
Filed Aug. 9, 1933

Frank A. Hayes
INVENTOR

BY Cooper, Kerr & Dunham
ATTORNEYS

Patented Dec. 18, 1934

1,984,797

UNITED STATES PATENT OFFICE 1,984,797

VARIABLE SPEED POWER TRANSMISSION MECHANISM

Frank A. Hayes, Middletown, N. J.

Application August 9, 1933, Serial No. 684,361
In Great Britain August 12, 1932

7 Claims. (Cl. 74—200)

This invention relates to variable speed power transmission mechanism of the kind in which friction rollers rock precessionally between torus disks and has particular reference to mechanisms in which there are two driving disks and an intervening driven disk and two sets of driving rollers mounted in rockable carriers and operating frictionally between the driving disks and the driven disk.

The chief object of the present invention is to provide improved means for limiting the extent of precessional movement of the rollers so that they will not precess to such extreme positions as would cause undue wear and strain.

In the specification of my Patent No. 1,865,102 pivotal rockers are described and shown rockable in a plane parallel to the planes of the disks for the purpose of causing or initiating precession of the rollers of each set and means are provided for preventing precession of the roller carriers beyond the maximum high or minimum low speed positions, such means as illustrated comprising a projection on each roller carrier adapted to come into contact with some fixed member or stop. In order not only to limit the precessional movements but cause the rollers to precess away from the extreme positions as they reach them, the roller carriers themselves might be displaced longitudinally by a camming action on the principle disclosed in my prior Patent No. 1,698,229 as for example by providing inter-acting helical cam surfaces on the aforesaid projection and stop, but a more practicable and efficient method of preventing the aforesaid strain and wear at the extreme roller positions is that which forms the subject of the present invention.

The mechanism according to the present invention which is an improvement in or modification of the mechanism claimed in the aforesaid parent Patent No. 1,865,102 resides essentially in the fact that the stop for engagement by each roller carrier is not fixed but is yieldable.

In the preferred construction as applied to a "duplex" transmission comprising two coaxial driving disks and an intermediate coaxial driven disk and two sets of intervening friction rollers, each stop is axially movable on a control sleeve mounted concentrically around the main shaft and adapted when rocked angularly to transmit angular movement to the two sets of rollers by suitable means such as a helical camming engagement between said sleeve and the respective rockers of the roller carriers. Each set of cams for each set of rollers is formed on an annular member or ring axially movable on the control sleeve, and the respective stops for the carriers of each set of rollers are also formed on said annular member or ring which latter therefore serves both as a camming member and as a stop member for its respective set of rollers. The setting of the helical cams on the two annular members on the sleeve is mutually opposite and their pitch is so chosen that the normal load reaction of the rockers tends to spread or increase the separation of said members along the sleeve, such movement being however limited by suitable collars thereon. The purpose and effect of the camming engagement of the control sleeve with the rockers of the roller carriers is to equalize the load on the sets of rollers.

Now according to the present invention the annular members on which the cams are formed and which also carry or serve as the stops for the roller carriers are axially movable along the sleeve within limits. Consequently as the rollers by their precessional movement approach one or other of their extreme oblique positions between the driving disks and the driven disk, the roller carriers come in contact with the stop portions of the annular members and move them axially. Owing to the angular setting of the helical cams the effect is to move the rockers in a direction to cause precession of the roller carriers in the opposite direction with the result that the rollers never quite reach the extreme positions.

With a torque responsive transmission the above described action is useful at the low speed end of the range, as overloads tend to force the rollers to this position. In the case of fixed stops the control has to be set slightly within the extreme low speed position to prevent the roller carriers bearing too hard on the stop under heavy overload conditions, and under such circumstances the rate of change into low speed position is slow, whereas by resorting to movable stops the control can be given a normal setting beyond the extreme low position and this difference in setting of the control is compensated by the axial movement of the stops with the result that the rate of change of the rollers towards their low speed position will be relatively fast.

In applications of the invention where relatively large inertia forces are encountered such as in an automobile drive, when coasting or using the engine as a brake, the rollers move toward the high speed position and since all of the reactions are then reversed and incidentally the stops are moved toward each other and against movement-limiting collars, the play in the roller carrier ends in the sockets of the rockers that support them is taken up with the result that the rollers tend to go beyond the normal high speed position for which the control is set under normal load conditions, and consequently the projections on the carriers will come into contact with the stops and spread them axially apart, thus imposing the necessary control on the rockers to arrest the angular movement of the rollers.

For the above applications it may be desirable to keep the cams in a mid position on the control sleeve, except when acted upon by the carrier stops. This can be done by inserting springs between the cams and their collars or by a spring plunger or other suitable form of latch.

Without this control, in order to prevent hard bearing of the roller carriers against the stops and consequent slight loss in efficiency of the transmission it would be necessary to limit the high speed position of the rollers under load to an angle which would hold the carriers a substantial distance away from the stops and thus lose a portion of the upper speed range of the transmission.

For simplicity of further description reference will now be made to the accompanying drawing in which:—

Figure 2:
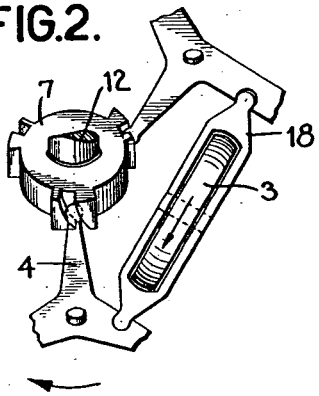

Figure 1 illustrates in longitudinal section the invention applied to a "duplex" transmission, and Figure 2 is a detail view taken on the line 2—2 of Figure 1 and looking in the direction of the arrows, but it is to be understood that the invention is not in any way limited to this particular embodiment.

It is immaterial from which end the transmission is driven but for convenience 12 will be considered the drive shaft, 1 the driving disks, 2 the driven disk and 17 the driven shaft in which the drive shaft is journalled at 16. The shaft 17 is driven from disk 2 by means of the drum 22 having teeth 23 engaging similar teeth on the disk.

The rollers 3 are supported in carriers 18 which are actuated by rockers 4. These in turn are actuated by the cam portions of two annular cam and stop members 7 and 8 mounted with slight axial freedom on control sleeve 6 which is attached to control spider or wheel 5 which latter can be shifted angularly within prescribed limits and thereby impart to the sleeve 6 a rocking angular movement for the purpose of controlling the precessional movement of the rollers and hence the speed ratio of the transmission.

Sleeve 6 is given clearance from the shaft 12 so that it cannot touch this shaft under any condition and it is also given clearance from the hole in the boss 19 of support 20 to which the front or left hand set of rockers is pivoted and which provides a supporting journal for the middle disc 2.

Secured to the boss 19 by splines or similar connections is the rear rocker supporting spider 21.

It will be observed that snap ring collars 11 are so set on the sleeve 6 as to allow a certain amount of axial play of the cam and stop members 7 and 8 towards and away from each other. The normal driving load reactions tend to separate these members. The rollers 3 are shown approaching the extreme low speed position and the projections 18a of the roller carriers 18 have just made contact with the members 7 and 8. Further angular movement of the rollers will evidently slide the said members 7 and 8 towards each other.

Referring now to Figure 2, the arrow on the roller 3 shows the direction of rotation of the roller and also the direction of the load force which the carrier imparts to the rocker 4 and which in turn the rocker 4 imparts to the cam and stop member 7. Each cam groove on the member 7 is a counter-clockwise helix relatively to the direction of rotation of the shaft 12 as shown by the arrow in Figure 1. Similarly the cams on member 8 are clockwise. It will therefore be seen that the force exerted on member 7 by the rocker is tending to move it leftwardly in Figure 1 and similarly the forces exerted by the rear set of rockers is tending to move member 8 rightwardly. The helical grooves, however, being equal and opposite, it will be understood that the loads are balanced, and so are the forces on sleeve 6.

Supposing now that the control spider 5 is set for the low speed position; the two sets of rollers then move towards the position shown in Figure 1 and stops 18a on the carriers after contacting with the cam and stop members 7 and 8 proceed to shift these members towards each other, which involves a rightward movement as regards cam and stop member 7 in Figure 1.

Referring now to Figure 2 it will be seen that this rightward movement of member 7 becomes a downward movement out of the plane of the paper, which moves the rocker 4 counterclockwise about its pivot and thus moves roller 3 in a direction opposite to that of the arrow thereon. But this movement, as already explained in my previous Patent No. 1,865,102 is such as to cause the roller and its carrier to precess towards the high speed position or in other words to bring stop 18a away from the cam and stop member 7. It will thus be seen that if the limiting low speed position of the control spider 5 is properly chosen the rollers will not precess beyond a position at which they begin to shift the member 7.

The action of the carriers on the member 8 is of course similar but in the opposite direction.

What I claim is:—

1. In a power transmission mechanism, in combination, co-axial torus disks, an interposed precessing friction roller and a rockable roller-carrier movable in one direction to cause precession of the roller toward a predetermined speed-ratio position, a yielding stop actuated by such precession of the roller, and means actuated by the yield of the stop to move the carrier in a direction to cause precession away from said predetermined speed-ratio position.

2. In a power transmission mechanism, in combination, co-axial torus disks, an interposed precessing friction roller and a rockable roller-carrier movable in one direction to cause precession of the roller toward a predetermined speed ratio position, a movable member actuated by such precession of the roller, means for limiting the movement of said member, and means actuated by said member to move the carrier in a direction to cause precession away from said predetermined speed-ratio position.

3. In a power transmission mechanism, in combination, co-axial torus disks, interposed precessing friction rollers and rockable roller-carriers movable in one direction to cause precession of the rollers toward a predetermined speed-ratio position, rockers supporting the roller-carriers and pivotally mounted for swinging movement to move the carriers in said direction, movable stop-means in the paths of the carriers for actuation thereby as the rollers approach said predetermined speed-ratio position, and means actuated by the movement of the stop-means to swing the rockers in a direction to cause precession away from said predetermined speed-ratio position.

4. A power transmission mechanism comprising a driving shaft, a coaxial driven shaft, torus disks attached to said shafts, friction rollers intervening between said disks, carriers for said rollers, rockers pivotally supporting said carriers, a sleeve coaxial with said shafts, and a cam and stop member axially movable within limits along said sleeve, said member having a camming engagement with the rockers and an abutting engagement with said carriers.

5. A power transmission mechanism comprising a driving shaft, a coaxial driven shaft, torus disks attached to said shafts, two sets of friction rollers between said disks, a set of carriers for each set of rollers, a set of rockers for pivotally supporting each set of carriers, a control sleeve common to the sets of rollers and coaxial with the shafts, and an annular cam and stop member for each set of carriers, each such member being independently slidable on the sleeve and having an abutting engagement with its own set of carriers in the limiting angular positions thereof with respect to the disks and a camming engagement with its own set of rockers, said camming engagements being mutually opposite.

6. A power transmission mechanism comprising a driving shaft, a coaxial driven shaft, torus disks attached to said shafts, friction rollers intervening between said disks, carriers for said rollers, rockers pivotally supporting said carriers, a sleeve coaxial with said shafts, projections on said carriers, and a cam and stop member axially movable within limits along said sleeve, said member having a camming engagement with the rockers and an abutting engagement with the projections on said carriers as the latter assume their limiting angular positions relatively to the disks.

7. A power transmission mechanism comprising a driving shaft, a coaxial driven shaft, torus disks attached to said shafts, two sets of friction rollers between said disks, a set of carriers for each set of rollers, a set of rockers for pivotally supporting each set of carriers, a control sleeve common to the sets of rollers and coaxial with the shafts, projections on each carrier and an annular cam and stop member for each set of carriers, each such member being independently slidable on the sleeve and having an abutting engagement with the projections on its own set of carriers in the limiting angular positions thereof relatively to the disks and a camming engagement with its own set of rockers, said camming engagements being mutually opposite.

FRANK A. HAYES.